United States Patent [19]

Schalles et al.

[11] 4,302,870

[45] Dec. 1, 1981

[54] INDEXABLE REVOLVING TURRET

[75] Inventors: Erhard Schalles; Reinhard Stender, both of Bielefeld; Herbert Seeger, Vlotho, all of Fed. Rep. of Germany

[73] Assignee: Gildemeister Aktiengesellschaft, Bielefeld, Fed. Rep. of Germany

[21] Appl. No.: 92,426

[22] Filed: Nov. 7, 1979

[30] Foreign Application Priority Data

Nov. 13, 1978 [DE] Fed. Rep. of Germany ....... 2849167

[51] Int. Cl.³ ............................................. B23B 29/32
[52] U.S. Cl. .................... 29/40; 29/48.5 A; 74/820; 74/813 L; 408/35
[58] Field of Search ................. 29/40, 48.5 R, 48.5 A; 408/35; 74/813 L, 820

[56] References Cited

U.S. PATENT DOCUMENTS 2,645,952 7/1953 Bunnell ................................ 408/35
3,606,804 9/1971 Gotz et al. ........................... 74/820
3,665,789 5/1972 Fisher ............................... 74/813 L

OTHER PUBLICATIONS

C. Cochran, R. Kain and M. Peterson, *IBM Technical Disclosure Bulletin*, vol. 10, No. 8, Jan. 1968, p. 1217.

Primary Examiner—Z. R. Bilinsky
Attorney, Agent, or Firm—Michael J. Striker

[57] ABSTRACT

An indexable revolving turret has a rotary tool carrier which is movable to a plurality of angularly spaced indexed positions, and an indexing shaft which is connected with the tool carrier for indexing the same to the respective ones of these positions. Cooperating spur gears are provided on the tool carrier and on the housing and become disengaged preliminarily to indexing of the tool carrier. A control shaft is driven by a drive so as to be rotated by the same and transmits motion to a Maltese-cross drive, an input member of which is mounted on and rotatable with the control shaft. The indexing shaft can be moved axially of itself, thereby moving the tool carrier into and out of indexing position, and for this purpose a cam drum is mounted on the control shaft and the cam follower slides in a cam groove of the cam drum and is connected with the indexing shaft so as to move the same into and out of an indexing position, depending upon the angular position of the cam drum.

8 Claims, 2 Drawing Figures

INDEXABLE REVOLVING TURRET

BACKGROUND OF THE INVENTION

The present invention relates to a revolving turret in general, and more particularly to an indexable revolving turret.

Still more specifically, the invention relates to an automatically indexing revolving turret, such as is used in tool machines.

It is known from German published application No. OS 2,103,741 to provide an indexable revolving turret having annular spur gears which effect the indexing of the turret. From this application it is also known to disengage the tool carrier of the turret from the annular spur gears provided for the indexing function, by means of a drive screw which is associated with a very complicated mechanical transmission having a large number of parts. This is required in order to be able to index the tool carrier after disengaging the annular spur gear provided on the tool carrier from the annular spur gear provided on the housing of the turret. The indexing positions are sensed by limit switches.

This prior-art construction provides for an exact and satisfactory indexing operation. However, it is structurally very complicated and therefore expensive and it requires a complicated control arrangement to provide an interlock against undesired movements. Also, the indexing movements are not as fast as is desirable.

Another type of indexable turret is known from German Pat. No. 969,332 in which the tool carrier is indexed (advanced) by a Maltese-cross drive. In this type of construction the indexing is based upon the snapping of a spring-loaded bolt or pin into appropriate recesses. It is then not necessary to move the tool carrier itself out of engagement, as in the preceding case where the engagement of spur gears on the tool carrier and on the housing must be temporarily interrupted. However, the use of such spring-loaded bolts or pins has the drawback that when the equipment is subjected to rough usage the indexing reliability is no longer as good as it should be, and particularly over a prolonged period of use the indexing accuracy will not be as effective as when spur gears are used.

SUMMARY OF THE INVENTION

Accordingly, it is a general object of this invention to avoid the disadvantages of the prior art.

A more particular object of the invention is to provide an improved indexable revolving turret in which indexing is always carried out reliably and with considerable rapidity.

Another object of the invention is to provide an indexable revolving turret of the type in question wherein the indexing is quick and accurate even when the equipment is subjected to rough operating conditions.

Still a further object of the invention is to provide an indexable revolving turret of the type outlined above, which is particularly simple in its construction, hence relatively immune to malfunction and comparatively inexpensive to construct.

In keeping with the above objects, and with others which will become apparent hereafter, one aspect of the invention resides in an indexable revolving turret which, briefly stated, may comprise a housing; a rotary tool carrier mounted in the housing for movement to a plurality of angularly spaced indexed positions; an indexing shaft connected with the tool carrier for indexing the same to the respective ones of the positions; a drive; a control shaft connectable with the drive to be rotated by the same; a Maltese-cross drive, including a member mounted on and rotatable with the control shaft; and means for moving the indexing shaft into and out of indexing engagement with the tool carrier, including a member having a cam groove and being mounted in the control shaft for rotation therewith, and a cam follower connected to the indexing shaft and engaging in the cam groove.

One of the significant advantages of the present invention results from the combination of the Maltese-cross drive with the use of the annular spur gears and the employment of a structurally particularly simple motion-control and transmission arrangement. Maltese-cross drives are known to operate very quickly, and since the cam track member for the indexing shaft and the driver of the Maltese-cross drive are both mounted on a common shaft, a very reliable association of the switching movement and the indexing is assured because it is enforced. It is not necessary to provide equipment for controlling the necessary functions, nor is it necessary to leave prime-consuming intervals for safety between the switching operation and the indexing movement. The construction overall is particularly simple and only a very few readily operable components are required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
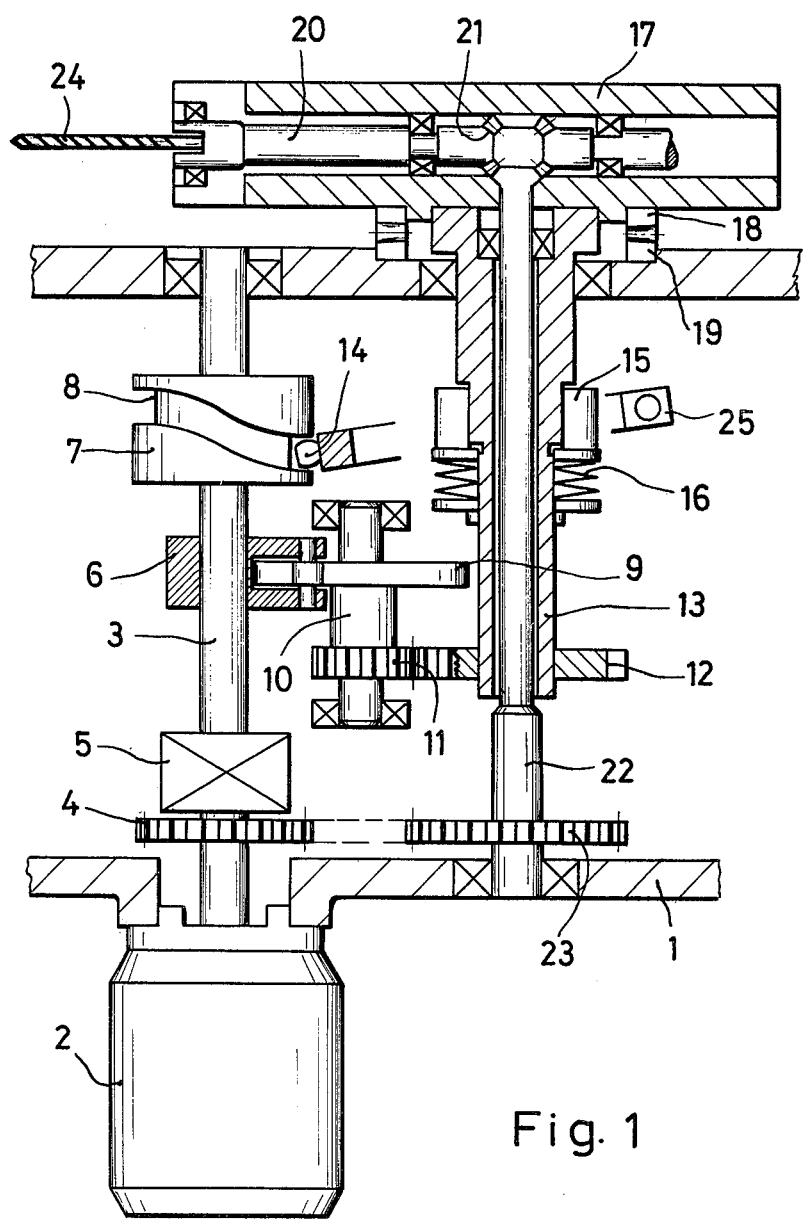
FIG. 1 is a somewhat simplified fragmentary section through the drive arrangement of an indexable revolving turret according to the present invention.

In the exemplary embodiment illustrated in FIG. 1 only those elements have been shown in detail which are necessary for an understanding of the invention. The elements not illustrated are conventional and known per se in the art.

It will be seen that reference numeral 1 identifies a housing of the turret on which there is mounted a drive motor 2, for example an electric motor. This is connected with a control shaft 3 which carries a gear 4 serving to transmit motion to the tools, a double coupling 5, the driver 6 of a Maltese-cross drive (such drives are known per se) and a drum 7 provided with an arcuate cam track or curve 8. The switching member 9 of the Maltese-cross drive is not mounted on the indexing shaft 13 for the turret, but instead is mounted on an intermediate shaft 10 which additionally carries a gear 11 meshing with a gear 12 mounted on the indexing shaft 13.

A cam follower member 14 secured to a bifurcated carrier 25 extends into the cam track 8 so as to slide therewithin. The carrier 25 is in turn connected with a pressure ring 15 via which it can transmit to the indexing shaft 13 a movement axially of the same, in the sense disengaging the two spur gears 18 and 19 from one another. The pressure ring 15 bears at one of its axial ends upon the indexing shaft 13 via an interposed package of springs 16 (e.g. Belleville springs).

The first of the aforementioned annular spur gears, namely the one identified with reference numeral 18, is secured in suitable manner to the plate-shaped rotary tool carrier 17, and its cooperating annular spur gear 19 is mounted on the housing 1.

The tool carrier 17 is provided with a plurality of tools (one shown) which can be driven in rotation and which are secured to the tool carrier 17 at angularly spaced locations of the latter. These tools 24 can be driven via a shaft 20 in the tool carrier 17, a bevel-gear drive 21, a tool drive shaft 22 which extends through the center of the indexing shaft 13, and the gear 23 which is mounted on a lower free end portion of the shaft 22 and receives motion from the gear 4 on the control shaft 3. Preferably, the shaft 22 extends centrically into the tool carrier 17, so that it can serve to drive all of the tools 24 at once. Each of the tools will, of course, have a separate drive shaft 20 associated with it although this is not specifically illustrated.

Figure 2:
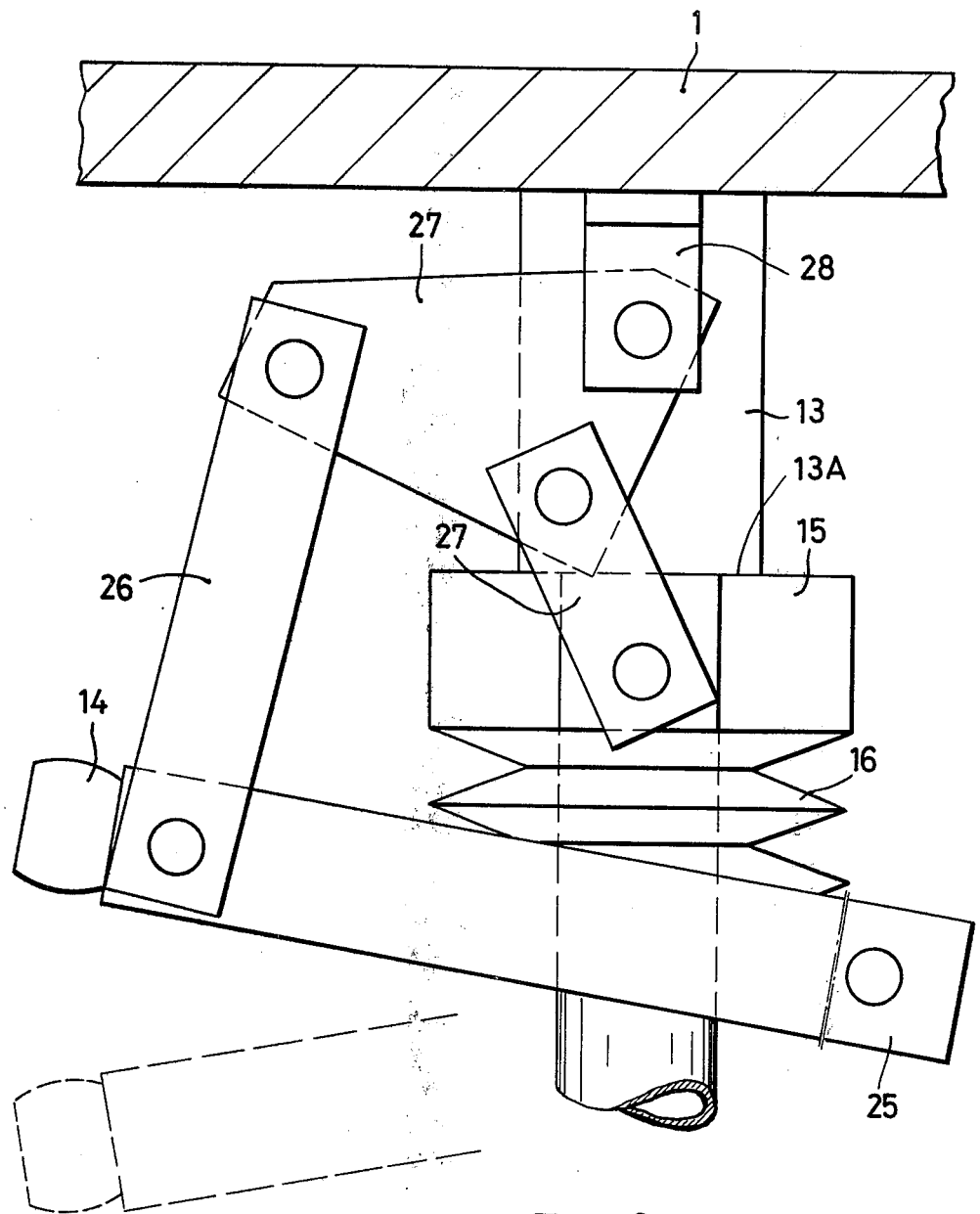
FIG. 2 is an enlarged detail view, partly sectioned, of the arrangement in FIG. 1.

FIG. 2 shows the latching mechanism which is associated with the turret of the invention. It will be seen that the bifurcated carrier 25 is turnably mounted on the housing 1 of the turret and in the region of the connection of the cam follower 14 it is articulated to the actuating link 26 of a toggle lever arrangement 27. This toggle lever arrangement is pivotally connected via a support 28 to the housing 1 of the turret and acts upon the pressure member 15 which surrounds the indexing shaft 13. The pressure member 15 is pressed by the packet of springs 16 against a shoulder 13a of the shaft 13.

When the machine control (not a part of the invention) provides a signal advising the rotary turret to change tools, the double coupling 5 (FIG. 1) connected with gear 4 at one side and with the upper part of shaft 3 at the other side, terminates the transmission of motion to the shaft 22. Instead, it now couples the upper part of the shaft 3 with the motor 2, causing this part of the shaft 3 and the drum 7 to rotate. Due to the illustrated configuration of the cam track 8 of the drum 7 the cam follower 14 and hence the carrier 25 is first made to move upwardly (in FIG. 1), thereby actuating the toggle lever system 27 and via the same causing the indexing shaft 3 to become lifted upwardly (in FIGS. 1 and 2), whereby the spur gears 18 and 19 move out of engagement with one another.

During the continued further rotation of the shaft 3 the Maltese-cross drive operates (switches) and thereby causes the tool carrier 17 to become indexed by one position, e.g. to turn about its upright central axis until tool 24 previously located in the operating position moves out of the operating position and the circumferentially adjacent tool now moves into the operating position. Such indexing movements are, of course, perfectly well known in the art.

When the indexing step has taken place, the cam follower 14 enters in the descending part of the cam groove 8 during continued rotation of the shaft 3 and consequently the drum 7, and now the carrier 25 and the member 15 move downwardly again, with the result that the indexing shaft 13 also moves downwardly, causing the toggle lever 27 to move to its extended position, during which movement the toggle lever draws via the member 15 and the packet of springs, the tool carrier 17 back into its new indexing position, i.e. to a position in which the gears 18 and 19 are again in engagement with one another. The packet of springs 16 is so compressed during this movement that the indexing position is maintained with a well-defined force, independently of the manufacturing tolerances of the elements which participate in the motion transmission. The extended position of the toggle lever system 27 causes a self-locking in this position, with respect to forces acting upon the arrangement during the operation of the tools on the carrier.

The maximum force exerted by the packet of springs 16 is preferably effective in the locked position of the tool carrier, i.e. when the tool carrier has been indexed and the gears 18 and 19 are back in engagement with one another. Of course, it is conceivable to omit the springs 16.

An advantage of having the intermediate shaft 10 connected with the shaft 13 by a gear transmission is that the gears can be changed, thereby varying the transmission ratio and thus the indexing angle in a very simple manner. The use of plural shafts 20 which drive the individual tools 24, permits the employment of standardized components which are commercially available on the market, thereby permitting the overall construction to be simple and relatively inexpensive.

An advantage of having all of the tools 24 driven at the same time is that it is possible to provide transverse bores in a stationary workpiece, and use of the toggle lever system 27 permits a self locking of the indexing operation, in such a manner that the tool carrier 17 cannot inadvertently be disengaged (with its gear 18) from the gear 19 of the housing 1, as a result of forces acting upon it while work is being done on a workpiece. Moreover, as a result of the lever transmission the forces required for indexing are kept particularly low.

While the invention has been illustrated and described as embodied in an indexable revolving turret, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An indexable revolving turret, comprising a housing; a rotary tool carrier mounted on said housing movable in axial direction between a locked and a released position and movable, when in said released position, between a plurality of angularly spaced indexing positions; a plurality of rotatable tools carried by said tool carrier; a tubular indexing shaft coaxially connected to said tool carrier for moving the latter between said locked and said released position and for indexing the same to the respective ones of said indexing positions; a tool drive shaft extending through said tubular indexing shaft coaxially therewith and operatively connected to said tools for rotating the same upon rotation of said tool drive shaft; a drive motor; a control shaft parallel to said indexing shaft; transmission means between said control shaft and said indexing shaft, said transmission means comprising a Maltese-cross drive; means for moving said tool carrier between said locked and said released position including a member mounted on said control shaft for rotation therewith and having a cam groove and cam follower means connected to said indexing shaft and engaging in said cam groove; further transmission means between said drive member and said tool drive shaft; and only one coupling means movable between a first position connecting said control shaft with said drive motor and a second position coupling said drive motor to said further transmission means.

2. A turret as defined in claim 9, said cam follower means including a first section extending into said cam groove, and a second section surrounding said indexing shaft.

3. A turret as defined in claim 2, said cam follower means further comprising spring means resiliently coupling it to said indexing shaft.

4. a turret as defined in claim 2, said cam follower further comprising a toggle lever connecting said second section with said indexing shaft.

5. A turret as defined in claim 9; further comprising a pair of cooperating spur gears on said housing and said tool carrier, respectively, and disengageable from one another prior to indexing of said tool carrier.

6. A turret as defined in claim 1, and further comprising an intermediate shaft between said control shaft and said indexing shaft, said Maltese-cross drive including a Maltese-cross mounted on said intermediate shaft, a drive member mounted on said control shaft for rotation therewith and being in engagement with said Maltese-cross, and a pair of meshing gears respectively mounted on said intermediate shaft and said indexing shaft for transmitting a drive from said intermediate shaft to said indexing shaft.

7. A turret as defined in claim 1, wherein said means for moving said tool carrier between said locked and said released positions further comprise a shoulder on said indexing shaft, a pressure ring surrounding said indexing shaft, toggle lever means between said housing and said pressure ring and movable by said cam follower means between an inclined position moving said pressure ring in engagement with said shoulder to lift said indexing shaft and to move thereby said tool carrier to said release position, and a straightened position to move said pressure ring away from said shoulder permitting thereby said tool carrier to move to said locked position.

8. A turret as defined in claim 7, and including compression spring means sandwiched between said pressure ring and an abutment on said indexing shaft to be compressed during movement of said toggle lever to said straightened position to thus exert a force for holding said tool carrier in said locked position.

* * * * *